United States Patent
Pullichola et al.

(10) Patent No.: US 8,399,597 B2
(45) Date of Patent: Mar. 19, 2013

(54) PHENOLIC RESIN FORMULATION AND COATINGS FOR ABRASIVE PRODUCTS

(75) Inventors: Abdul Habid Pullichola, Kerala (IN); Adiseshaiah K. Seshu, Clifton Park, NY (US); Kottotil Mohan Das, Bangalore (IN); Jagmohan Verma, Durgapur (IN); Olivier Pons Y Moll, Agnetz (FR); Philippe Espiard, Gouvieux (FR)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 72 days.

(21) Appl. No.: 12/284,349

(22) Filed: Sep. 19, 2008

(65) Prior Publication Data

US 2009/0149624 A1    Jun. 11, 2009

Related U.S. Application Data

(60) Provisional application No. 60/994,743, filed on Sep. 21, 2007.

(51) Int. Cl.
- C08G 8/00 (2006.01)
- C08G 14/06 (2006.01)

(52) U.S. Cl. .................................. 528/155; 528/162

(58) Field of Classification Search .................. 528/155, 528/162

See application file for complete search history.

(56) References Cited

U.S. PATENT DOCUMENTS

| | | | | |
|---|---|---|---|---|
| 2,417,975 A | * | 3/1947 | Ebers | 524/501 |
| 2,489,336 A | * | 11/1949 | Spahr et al. | 528/155 |
| 2,614,096 A | * | 10/1952 | Spahr | 526/59 |
| 3,058,819 A | | 10/1962 | Paulson | |
| 3,389,125 A | * | 6/1968 | Dietrick et al. | 528/140 |
| 3,492,263 A | * | 1/1970 | Kreibich et al. | 524/541 |
| 3,616,179 A | * | 10/1971 | McCombs et al. | 524/595 |
| 3,619,150 A | | 11/1971 | Biglin | |
| 3,888,813 A | * | 6/1975 | Moult et al. | 524/510 |
| 3,919,151 A | * | 11/1975 | Moult et al. | 524/594 |
| 3,944,703 A | | 3/1976 | Harding | |
| 3,962,491 A | | 6/1976 | Sato et al. | |
| 4,033,909 A | | 7/1977 | Papa | |
| 4,033,910 A | | 7/1977 | Papa | |
| 4,042,559 A | | 8/1977 | Abelson et al | |
| 4,061,620 A | * | 12/1977 | Gillern | 524/841 |
| 4,070,313 A | | 1/1978 | Papa | |

(Continued)

FOREIGN PATENT DOCUMENTS

AR    220721 A1    11/1980
AR    228075 A1    1/1983

(Continued)

OTHER PUBLICATIONS

Machine translation of WO 9005154 A1, 2010.*

(Continued)

*Primary Examiner* — Liam Heincer
(74) *Attorney, Agent, or Firm* — Joseph P. Sullivan; Abel Law Group, LLP

(57) ABSTRACT

A resorcinol-modified phenolic resin composition is formed by reacting a basic catalyst, formaldehyde, water and a benzene-ol to form an intermediate composition to which resorcinol is subsequently added to reduce the presence of free formaldehyde. Optionally, an alkanolamine can be combined and reacted with the resorcinol-modified phenolic resin composition to form a resorcinol-alkanolamine-modified phenolic resin composition. The resorcinol-modified phenolic resin and the resorcinol-alkanolamine-modified phenolic resin compositions can be employed to coat abrasive products having a relatively low free formaldehyde content.

34 Claims, 2 Drawing Sheets

U.S. PATENT DOCUMENTS

| | | | | |
|---|---|---|---|---|
| 4,151,028 A * | 4/1979 | Eaton | | 156/307.5 |
| 4,298,356 A * | 11/1981 | Teschner et al. | | 51/297 |
| 4,373,062 A * | 2/1983 | Brown | | 524/841 |
| 4,433,120 A | 2/1984 | Chiu | | |
| 4,466,995 A | 8/1984 | Boxall et al. | | |
| 4,539,338 A * | 9/1985 | Carlson et al. | | 521/131 |
| 4,546,119 A * | 10/1985 | Lunt et al. | | 521/131 |
| 4,608,408 A * | 8/1986 | Hood et al. | | 524/15 |
| 4,690,692 A | 9/1987 | Hesse et al. | | |
| 4,694,028 A | 9/1987 | Saeki et al. | | |
| 4,799,548 A * | 1/1989 | Mumallah et al. | | 166/288 |
| 4,913,708 A | 4/1990 | Kalinowski | | |
| 5,034,497 A | 7/1991 | Waitkus | | |
| 5,075,413 A * | 12/1991 | Dailey, Jr. | | 528/129 |
| 5,075,414 A * | 12/1991 | Dailey, Jr. | | 528/129 |
| 5,079,067 A * | 1/1992 | Willging | | 428/182 |
| 5,354,788 A | 10/1994 | Johnson et al. | | |
| 5,461,108 A * | 10/1995 | Lewis | | 524/596 |
| 5,623,032 A | 4/1997 | Wu | | |
| 5,637,658 A * | 6/1997 | Teodorczyk | | 525/480 |
| 5,646,219 A * | 7/1997 | Teodorczyk | | 525/524 |
| 5,700,587 A | 12/1997 | Shiau et al. | | |
| 5,756,599 A * | 5/1998 | Teodorczyk | | 525/491 |
| 6,150,492 A * | 11/2000 | Phillips et al. | | 528/144 |
| 6,387,986 B1 | 5/2002 | Moradi-Araghi et al. | | |
| 6,410,776 B1 | 6/2002 | Roll et al. | | |
| 6,572,666 B1 | 6/2003 | Nettleship et al. | | |
| 6,608,162 B1 * | 8/2003 | Chiu et al. | | 528/129 |
| 2004/0036056 A1 * | 2/2004 | Shea et al. | | 252/182.13 |
| 2005/0085167 A1 | 4/2005 | Swei et al. | | |
| 2006/0094853 A1 | 5/2006 | Arbuckle | | |
| 2006/0270809 A1 * | 11/2006 | Boyer et al. | | 525/509 |
| 2007/0011951 A1 | 1/2007 | Gaeta | | |
| 2007/0020476 A1 * | 1/2007 | Kintzley et al. | | 428/537.1 |
| 2007/0105985 A1 * | 5/2007 | Gillette et al. | | 524/34 |
| 2009/0088516 A1 * | 4/2009 | Li et al. | | 524/502 |
| 2009/0149624 A1 * | 6/2009 | Pullichola et al. | | 528/155 |
| 2009/0181260 A1 * | 7/2009 | Verma et al. | | 428/524 |

FOREIGN PATENT DOCUMENTS

| | | |
|---|---|---|
| AR | 001186 A1 | 9/1997 |
| AT | 326359 | 12/1975 |
| AT | 372895 B | 11/1983 |
| AT | 252083 | 11/2003 |
| AU | 5376879 A1 | 6/1980 |
| AU | 517721 | 8/1981 |
| AU | 4973285 A1 | 6/1986 |
| AU | 595629 B2 | 4/1990 |
| AU | 636077 B2 | 4/1993 |
| AU | 4017393 A1 | 5/1994 |
| AU | 3360895 A1 | 3/1996 |
| AU | 3726697 A1 | 5/1998 |
| AU | 2003/230556 A | 9/2003 |
| BE | 849677 A1 | 4/1977 |
| CA | 1217641 A1 | 2/1987 |
| CA | 1224585 A1 | 7/1987 |
| CA | 1250077 A1 | 2/1989 |
| CA | 2025177 | 3/1991 |
| CA | 2369237 A1 | 7/2002 |
| DE | 1085664 B | 7/1960 |
| DE | 1570848 A1 | 4/1970 |
| DE | 1569511 A1 | 6/1970 |
| DE | 1652893 A1 | 3/1971 |
| DE | 3136556 A1 | 6/1982 |
| DE | 3705540 A1 | 12/1987 |
| EP | 0078896 A2 | 5/1983 |
| FR | 1143003 A | 9/1957 |
| FR | 2688794 A1 | 9/1993 |
| GB | 572679 A | 10/1945 |
| GB | 605187 A | 7/1948 |
| GB | 613106 A | 11/1948 |
| GB | 631109 A | 10/1949 |
| GB | 768125 A | 2/1957 |
| GB | 808271 A | 2/1959 |
| GB | 813372 A | 5/1959 |
| GB | 956372 A | 4/1964 |
| GB | 982215 A | 2/1965 |
| GB | 1177656 | 1/1970 |
| GB | 1185576 | 3/1970 |
| GB | 1217081 A | 12/1970 |
| GB | 1453956 | 10/1976 |
| GB | 1509358 A | 5/1978 |
| JP | 57169748 A | 10/1982 |
| JP | 58113931 2 | 7/1983 |
| JP | 10259368 A | 9/1998 |
| LU | 50329 A1 | 1/1967 |
| WO | WO 9005154 A1 * | 5/1990 |
| WO | WO 98/18610 A1 | 5/1998 |
| WO | WO 02/062531 A1 | 8/2002 |
| WO | WO 03/078495 A1 | 9/2003 |
| WO | WO 2007/040410 A1 | 4/2007 |
| ZA | 7208405 A | 7/1973 |

OTHER PUBLICATIONS

Viscosity Conversion Chart, www.clearcoproducts.com, 2010.*

Chow, S., "A Curing Study of Phenol-Resorcinol-Formaldehyde Resins Using Infrared Spectrometer and Thermal Analysis," *Holzforschung*, 31(6): 200-205(1977).

Dietrick, M.I., et al., "Resorcinol Derivatives for Scavenging Formaldehyde in Particleboard," *Proceedings of the 17th Washington State University International Particleboard/Composite Materials Symposium*: 233-248 (1983).

Ebewele, R.O., et al., "Relationship Between Phenolic Adhesive Chemistry, Cure and Joint Performance. I. Effects of Base Resin Constitution and Hardener on Fracture Energy and Thermal Effects During Cure," *J. Adhes.*, (SO1), 14(¾:) 189-217 (1982).

Hamanda, R., et al., "Evaluation of Ambient-Temperature Setting Properties of Phenol-Resorcinol-Formaldehyde Resin Wood Adhesives by TBA Method," (S2) *Zairyo/Journal of the Society of Material Science*, 34(383): 925-929 (1985).

Karchesy, J.J., et al., "Fast Curing Carbohydrate-Based Adhesives," *ACS Symposium Series; American Chemical Society*, 385: 387-394 (1989).

Kikuchi, Y., et al., "Highly Cooperative Binding of Alkyl Glucopyranosides to the Resorcinol Cyclic Tetramer Due to Intracomplex Guest-Guest Hydrogen-Bonding: Solvophobicity/Solvophilicity Control by an Alkyl Group of the Geometry, Stoichiometry, Stereoselectivity, and Cooperativity," *J. Am. Chem. Soc.*, 114(26): 10302-10306 (1992).

Koo, J.H., et al., "Nanoreinforced Phenol-Resorcinol-Formaldehyde Composites—Flammability Properties," (CT) *50th International SAMPE Symposium and*.

Notification of Transmittal of the International Preliminary Report on Patentability, PCT/US2008/077030, mailing date Dec. 7, 2009.

Lisperguer, J., et al., "Differential Scanning Calorimetry and Dinamic Mechanical Analysis of Phenol-Resorcinol-Formaldehyde Resins," *J. Chilean Chem. Soc.*, 50: 451-453 (2005) Abstract.

Lisperguer, J.H., et al., "Thermal Analysis and Adhesive Properties of Phenol-Resorcinol-Formaldehyde Resins," *Informacion Tecnologica*, (VO) 16(6): 27-31 (2005) (Abstract).

Scopelitis, E., et al., "Chemistry and Development of Branched PRF Wood Adhesives of Low Resorcinol Content," *J. Appl. Polym. Sci.*, 47: 351-360 (1993).

International Search Report and Written Opinion, PCT/US2008/077030, mailing date Dec. 29, 2008.

* cited by examiner understand# PHENOLIC RESIN FORMULATION AND COATINGS FOR ABRASIVE PRODUCTS

RELATED APPLICATION

This application claims the benefit of U.S. Provisional Application No. 60/994,743, filed Sep. 21, 2007. The entire teachings of the above application are incorporated herein by reference.

BACKGROUND OF THE INVENTION

Resoles are fusable resins soluble in alkali and alcohol and that are formed by an alkaline condensation of phenol and an aldehyde to form a phenolic resin. Phenolic resins are commonly used in laminating and impregnating paper and fabrics, and in forming coatings for abrasive products. Free formaldehyde generally is a by-product of forming phenolic resins that can be released during manufacture of abrasive products coated with phenolic resin. Formaldehyde may represent a potential health hazard.

Depending upon the application, polyacrylamide, urea and other compounds have been employed to scavenge formaldehyde to thereby minimize its release during processing and use of phenolic resins. However, known scavengers can deleteriously affect the handling characteristics of the resins with which they are combined, and can limit performance of products incorporating such resins.

Therefore, a need exists for phenolic resin formulations, particularly with respect to coatings of abrasive products, that minimize or eliminate the potential hazard associated with release of formaldehyde, without detracting from the performance of products incorporating phenolic resins.

SUMMARY OF THE INVENTION

This invention is directed to a method of forming a phenolic resin formulation having a reduced formaldehyde content, and to abrasive products and methods of making abrasive products that incorporate phenolic resin formulations having a reduced formaldehyde content.

In one embodiment, the invention is directed to a method of forming a modified phenolic resin having a reduced formaldehyde content. The method includes combining a basic catalyst, formaldehyde, water and a benzene-ol to form a reaction mixture undergoing chemical reaction. The reaction is terminated when water tolerance of the reaction mixture is in a range of between about 150% and about 1000% to thereby form an intermediate composition. Resorcinol is then added to the intermediate composition in an amount of between about 1 wt % and about 15 wt % of the weight of the benzene-ol combined to form the reaction mixture, whereby the resorcinol undergoes chemical reaction with the intermediate composition to form a modified phenolic resin composition including a resorcinol-modified phenolic resin.

In another embodiment, the invention is a modified phenolic resin composition formed by a method of the invention described above.

In yet another embodiment, an abrasive article is formed by a method that includes forming a curable resin composition that includes a modified phenolic resin composition, contacting a plurality of abrasive particles with the curable resin composition, and curing the curable resin composition to product the abrasive product. The modified phenolic resin composition is formed by combining a basic catalyst, formaldehyde, water and a benzene-ol to form a reaction mixture undergoing chemical reaction. The reaction is terminated when water tolerance of the reaction mixture is in a range of between about 150% and about 1000% to thereby form an intermediate composition. Resorcinol is then added to the intermediate composition in an amount of between about 1 wt % and about 15 wt % of the weight of the benzene-ol combined to form the reaction mixture, whereby the resorcinol undergoes chemical reaction with the intermediate composition to form a modified phenolic resin composition including a resorcinol-modified phenolic resin.

In yet another embodiment, the invention is an abrasive product formed by a method of the invention described above.

In yet another embodiment, a coated abrasive product is formed by a method that includes combining a basic catalyst, formaldehyde, water and a benzene-ol to form a reaction mixture undergoing chemical reaction. The reaction is terminated when water tolerance of the reaction mixture is in a range of between about 150% and about 1000 to thereby form an intermediate composition. Resorcinol is then added to the intermediate composition in an amount of between about 1 wt % and about 15 wt % of the weight of the benzene-ol combined to form the reaction mixture, whereby the resorcinol undergoes chemical reaction with the intermediate composition to form a resorcinol-modified phenolic resin. A coating that includes the resorcinol-modified phenolic resin is applied to an abrasive product, and the coating is then cured to form the coated abrasive product.

In yet another embodiment, a coated abrasive product is formed by a method that includes combining a basic catalyst, formaldehyde, water and a benzene-ol to form a reaction mixture undergoing chemical reaction. The reaction is terminated when water tolerance of the reaction mixture is in a range of between about 150% and about 1000 to thereby form an intermediate composition. Resorcinol is then added to the intermediate composition in an amount of between about 1 wt % and about 15 wt % of the weight of the benzene-ol combined to form the reaction mixture, whereby the resorcinol undergoes chemical reaction with the intermediate composition to form a composition including a resorcinol-modified phenolic resin. An alkanolamine is then added to the resorcinol-modified phenolic resin composition in an amount of between about 0.1 wt % and about 15 wt % based on the weight of the benzene-ol combined to form the reaction mixture, whereby the alkanolamine undergoes chemical reaction with the resorcinol-modified phenolic resin composition to thereby form a resorcinol-alkanolamine-modified phenolic resin. A coating that includes the resorcinol-alkanolamine-modified phenolic resin is applied to an abrasive product, and the coating is then cured to form the coated abrasive product.

In yet another embodiment, the invention is a coated abrasive product formed by a method of the invention described above.

In yet another embodiment, a bonded abrasive product is formed by a method that includes combining a basic catalyst, formaldehyde, water and a benzene-ol to form a reaction mixture undergoing chemical reaction. The reaction is terminated when water tolerance of the reaction mixture is in a range of between about 150% and about 1000 to thereby form an intermediate composition. Resorcinol is then added to the intermediate composition in an amount between about 1 wt % and about 15 wt % of the weight of the benzene-ol combined to form the reaction mixture, whereby the resorcinol undergoes chemical reaction with the intermediate composition to form a resorcinol-modified phenolic resin. A curable resin composition that includes the resorcinol-modified phenolic resin is mixed with abrasive particles, and the mixture is formed into a desired shape. The curable resin composition is then cured to form the bonded abrasive product.

In yet another embodiment, a bonded abrasive product is formed by a method that includes combining a basic catalyst, formaldehyde, water and a benzene-ol to form a reaction mixture undergoing chemical reaction. The reaction is terminated when water tolerance of the reaction mixture is in a range of between about 150% and about 1000% to thereby form an intermediate composition. Resorcinol is then added to the intermediate composition in an amount of between about 1 wt % and about 15 wt % of the weight of the benzene-ol combined to form the reaction mixture, whereby the resorcinol undergoes chemical reaction with the intermediate composition to form a composition including a resorcinol-modified phenolic resin. An alkanolamine is then added to the resorcinol-modified phenolic resin composition in an amount of between about 0.1 wt % and about 15 wt % based on the weight of the benzene-ol combined to form the reaction mixture, whereby the alkanolamine undergoes chemical reaction with the resorcinol-modified phenolic resin composition to thereby form a resorcinol-alkanolamine-modified phenolic resin. A curable resin composition that includes the resorcinol-alkanolamine-modified phenolic resin is mixed with abrasive particles, and the mixture is formed into a desired shape. The curable resin composition is then cured to form the bonded abrasive product.

In yet another embodiment, the invention is a bonded abrasive product formed by a method of the invention described above.

In still another embodiment of the invention, a resorcinol-modified phenolic resin formulation having a reduced formaldehyde content is formed by combining formaldehyde in water, phenol in a molar ratio to the formaldehyde in a range of between about 1:1 and about 1:2.3, and sodium hydroxide in an amount in a range of between about 1% and about 5% by weight of the phenol, to thereby form a reaction mixture undergoing chemical reaction. Temperature of the reaction mixture is adjusted to have a temperature in a range between about 85° C. and about 95° C. The reaction of the reaction mixture is terminated by lowering the temperature to a temperature equal to or less than about 50° C., when water tolerance of the reaction mixture is in a range between about 150% and about 1000% to thereby form an intermediate composition. Resorcinol is added to the intermediate composition in an amount in a range of between about 1 wt % and about 15 wt % of the amount of the phenol combined to form the reaction mixture. The temperature of the mixture of the resorcinol and the intermediate composition is adjusted to a temperature in a range of between about 55° C. and about 65° C., whereby the resorcinol undergoes chemical reaction with the intermediate composition. At least a portion of water from a reaction mixture resulting from the reaction with the resorcinol is removed by a vacuum distillation to thereby obtain a resorcinol-modified phenolic resin formulation having a viscosity in a range of between about 2,000 cps and about 20,000 cps at about 25° C.

In still another embodiment of the invention, a resorcinol-alkanolamine-modified phenolic resin formulation having a reduced formaldehyde content is formed by combining formaldehyde in water, phenol in a molar ratio to the formaldehyde in a range of between about 1:1 and about 1:2.3, and sodium hydroxide in an amount in a range of between about 1% and about 5% by weight of the phenol, to thereby form a reaction mixture undergoing chemical reaction. Temperature of the reaction mixture is adjusted to have a temperature in a range between about 85° C. and about 95° C. The reaction of the reaction mixture is terminated by lowering the temperature to a temperature equal to or less than about 50° C., when water tolerance of the reaction mixture is in a range between about 150% and about 1000% to thereby form an intermediate composition. Resorcinol is added to the intermediate composition in an amount in a range of between about 1 wt % and about 15 wt % of the amount of the phenol combined to form the reaction mixture. The temperature of the mixture of the resorcinol and the intermediate composition is adjusted to a temperature in a range of between about 55° C. and about 65° C., whereby the resorcinol undergoes chemical reaction with the intermediate composition to form a composition including a resorcinol-modified phenolic resin. An alkanolamine is then added to the resorcinol-modified phenolic resin composition in an amount in a range of between about 0.1 wt % and about 15 wt % based on the weight of the benzene-ol combined to form the reaction mixture. The temperature of the combined mixture of the alkanolamine and the resorcinol-modified phenolic resin composition is adjusted to a temperature in a range of between about 55° C. and about 65° C., whereby the alkanolamine undergoes chemical reaction with the resorcinol-modified phenolic resin composition to form a resorcinol-alkanolamine modified phenolic resin formulation having a viscosity in a range of between about 2,000 cps and about 20,000 cps at about 25° C.

This invention has many advantages. For example, the formaldehyde content can be reduced from an amount of about 1.2%, which is common in known phenolic resin compositions, to less than about 0.3%, without affecting the properties of the resin. Further, water tolerance of the reaction mixture can be relatively high to thereby cause gel time to be somewhat higher than that of generally known resins. Further, the modified phenolic resin formulations of the invention have a viscosity that is relatively stable over extended periods of time at room temperature. Therefore, coated abrasive products can be formed using the modified phenolic resin formulations of the invention without processing concerns associated with release of formaldehyde and without diminishing stability or other properties of the resin. Further, abrasive products coated with the modified phenolic resin formulations of the invention can have performance characteristics that are superior to those of coated products employing known phenolic resins.

DETAILED DESCRIPTION OF THE INVENTION

Figure 1:
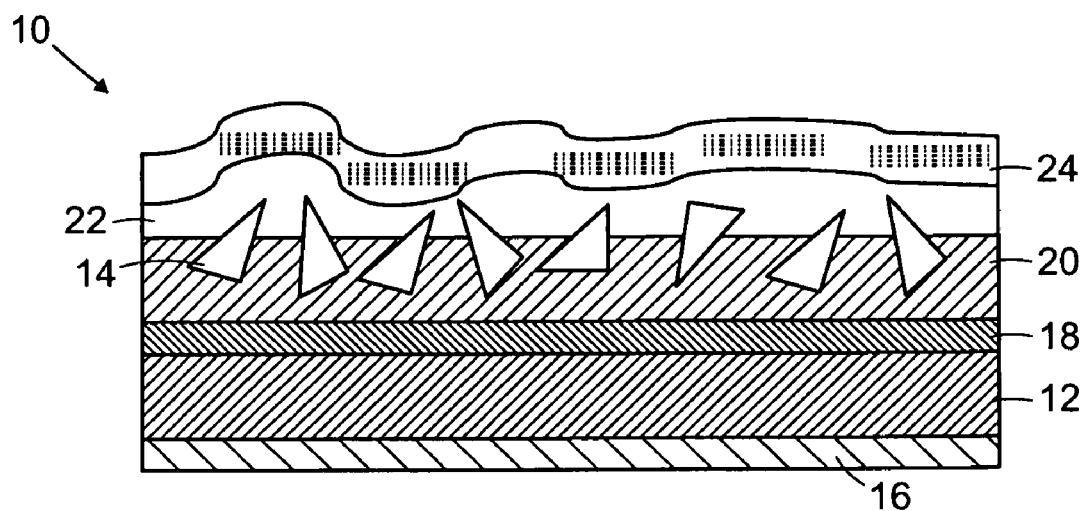
FIG. 1 is a schematic representation of a cross-sectional view of one embodiment of a coated abrasive product of the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The invention generally relates to a process for preparing a stable modified phenolic resin formulation that includes a resorcinol-modified phenolic resin or a resorcinol-alkanolamine-modified phenolic resin for abrasive products, and for reducing formaldehyde liberation during manufacturing and/or storage of the abrasive products. The invention also relates to a modified phenolic resin which is used for improving mechanical and thermal properties of abrasive products. Although not wishing to be limited to any particular mechanism, it is believed that resorcinol and/or alkanolamine added as part of the method of the invention operates as a formaldehyde scavenger during resin synthesis to thereby produce a formulation that is relatively stable and which reduces formaldehyde emission during subsequent processing of the resin product.

The method of forming a modified phenolic resin formulation having a reduced formaldehyde content includes forming a reaction mixture that includes formaldehyde, preferably in an aqueous solution, a benzene-ol and a basic catalyst. As used herein, a "benzene-ol" means a phenol-type compound represented by a structural formula selected from the group consisting of:

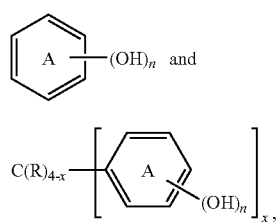

wherein each R is independently —H or an optionally substituted C1-C6 alkyl; each n independently is 1, 2 or 3; and each x is 1, 2 or 3. Preferably, each R is independently —H or an unsubstituted C1-C6 alkyl, such as —CH$_3$ or —C$_2$H$_5$. Ring A is optionally substituted with one or more substituents other than —OH. Suitable substituents include halogen (e.g., F, Cl, Br, I), an alkyl group of C1-C5 (e.g., methyl, ethyl, tert-butyl, n-pentyl, etc.), phenyl and benzyl. Suitable specific examples of phenol-type compounds include phenol (i.e., C$_6$H$_4$OH), p-tert-butyl phenol, p-amyl phenol, CH$_2$(C$_6$H$_4$OH)$_2$ or C(CH$_3$)$_2$(C$_6$H$_4$OH)$_2$. In a specific embodiment, ring A is not substituted. Preferably, the benzene-ol is a phenol-type compound represented by structural formula (A). Alternatively, the benzene-ol is a phenol-type compound represented by structural formula (B), wherein each R is independently —H or an unsubstituted C1-C6 alkyl, such as —CH$_3$ or —C$_2$H$_5$. Alternatively, the benzene-ol is a phenol-type compound represented by structural formula (B), wherein each R is independently —H or an unsubstituted C1-C6 alkyl, such as —CH$_3$ or —C$_2$H$_5$, and x is 1 or 2. More preferably, the benzene-ol is a phenol-type compound represented by structural formula (A) and Ring A is not substituted. Even more preferably, the benzene-ol is phenol (i.e., C$_6$H$_5$OH). In one embodiment, the benzene-ol is technical grade phenol is employed having a minimum purity of about 94%.

Formaldehyde generally exists in several forms, including the monomeric form represented by H$_2$CO, the cyclic trimer (troxane) and the polymeric form (paraformaldehyde). Additionally, in water, it exists as the hydrate H$_2$C(OH)$_2$. As used herein, a "formaldehyde" includes all of these forms. Any suitable commercially available formaldehyde, including a formaldehyde solution, can be used in the invention. In one embodiment, an aqueous formaldehyde solution is employed in the invention, wherein the aqueous formaldehyde solution has a formaldehyde content of between about 30 wt % and about 38.5 wt %, and preferably between about 35 wt % and about 38.5%, such as about 35 wt %, about 36.5 wt %, about 37 wt %, about 37.5 wt %, 38 wt % and about 38.3 wt %. In a preferred embodiment, methanol is added to the formaldehyde solution to stabilize the formaldehyde and avoid the formation of para-formaldehyde. In a particularly preferred embodiment, the amount of methanol in the aqueous solution is in a range of between about 1 wt % and about 5 wt %, and more preferably about 3.5 wt %. In another embodiment, paraformaldehyde is employed in the invention.

Typically, the amount of the benzene-ol, such as phenol, present in the reaction mixture is in a molar ratio to formaldehyde in a range of between about 1:1 and about 1:2.3, and preferably in a molar ratio of about 1:1.73.

Any suitable basic catalyst known in the phenolic resin art can be used in the invention. In one embodiment, a suitable basic catalyst is selected from the group consisting of sodium hydroxide, lithium hydroxide, barium hydroxide and hydrates thereof. Combinations of these catalysts also can be used, for example, a mixture of barium hydroxide and lithium hydroxide. In a preferred embodiment, the basic catalyst is sodium hydroxide. Typically, the amount of sodium hydroxide catalyst is in a range of about 1 wt % and about 5 wt % of the amount of the benzene-ol, such as phenol, in the reaction mixture. In a specific embodiment, the amount of sodium hydroxide catalyst is about 2 wt % of the amount of the benzene-ol, such as phenol, in the reaction mixture. Typically, the amount of the benzene-ol in the reaction mixture is calculated based on the concentration or purity of a source of the benzene-ol.

In one embodiment, the reaction mixture, including formaldehyde and a benzene-ol, is heated to have a temperature in a range of between about 40° C. and about 50° C., such as about between about 45° C. and about 50° C. (e.g., about 45° C.). A basic catalyst is then added to the reaction mixture. In a specific embodiment, the temperature of the reaction mixture, into which the basic catalyst is added, does not exceed about 50° C. Preferably, the temperature of the reaction mixture is controlled within about 1° C. In another specific embodiment where formaldehyde in paraformaldehyde form is employed, the resulting reaction mixture that includes formaldehyde, a benzene-ol and a basic catalyst is kept at a temperature in a range of between about 40° C. and about 50° C., such as about between about 45° C. and about 50° C. (e.g., about 45° C.) for at least about 30 minutes, such as for at least about 1 hour, or for about at least about 2 hours (e.g., for about 2.5 hours).

The resulting reaction mixture that includes formaldehyde, benzene-ol and a basic catalyst, in one embodiment, is then heated to have a temperature in a range of between about 50° C. and about 90° C. In a specific embodiment, the increase of the temperature of the reaction mixture is made with a rate in a range of between about 1° C./min. and about 10° C./min. The reaction is exothermic and, preferably, controlled within +/−1° C. once a desired maximum reaction temperature is reached. Preferably, the desired maximum reaction temperature is in a range of between about 80° C. and about 95° C., such as between about 80° C. and about 90° C. and between about 85° C. and about 95° C. The amount of time over which the reaction mixture is maintained at the desired maximum temperature can be varied depending upon the scale of the reaction and depending upon the desired water tolerance, which one skilled in the art can determine without undue experimentation in view of the teachings of the present application. Typically, the amount of time over which the reaction mixture is maintained at the desired maximum temperature is less than about 1.5 hours, and most preferably about 1 hour. In a preferred embodiment, the reaction mixture is maintained at a temperature of between about 85° C. and about 95° C., or between about 85° C. and about 90° C., for a reaction period in a range of between about 0.5 hours and about 1.5 hours. Preferably, the temperature of the reaction mixture is controlled using a bath, such as a water bath.

The pH of the reaction mixture preferably is in a range of between about 8.3 and about 9.3, and most preferably is about 8.9. The pH of the reaction mixture can be adjusted with a suitable acid, or by addition of a suitable base. Any suitable acid and base known in the art can be used in the invention. Suitable examples of acids include sulfonic acids, such as p-toluene sulfonic acids, phenolic sulfonic acids, cumene sulfonic acids and methane sulfonic acids, and phosphoric acids. Suitable examples of bases include alkali and/or alkaline metal hydroxides, such as NaOH, LiOH, KOH, $Mg(OH)_2$, $Ca(OH)_2$, and $Ba(OH)_2$, and combinations of thereof, such as a mixture of $Ba(OH)_2$ and $LiOH$.

Molecular weight of a phenolic resin increases during the reaction between the benzene-ol and formaldehyde, and the progress of the reaction can be indicated by water tolerance. Water tolerance generally indicates the approximate molecular weight of the phenolic resin formed from the reaction between the benzene-ol and formaldehyde. Once the reaction progresses, a portion of the reaction mixture, for example, about 10-20 ml of the reaction mixture, is withdrawn for a water tolerance measurement. The withdrawn mixture ($W_1$ in weight) is poured into a vehicle, such as a glass beaker. Then distilled water ($W_2$ in weight) is added to the vehicle until turbidity appears. Once turbidity develops, the water tolerance can be calculated as follows:

$$\% \text{ water tolerance} = (W_2)/(W_1) * 100 \quad (1)$$

The reaction between the benzene-ol and formaldehyde is terminated when the water tolerance has reached a suitable percentage, to thereby form an intermediate composition. An example of a suitable water tolerance is a water tolerance in a range of between about 150% and 1000%. Preferably, the water tolerance is in a range of between about 150% and about 800%. More preferably, the water tolerance is in a range of between about 150% and about 600%. Even more preferably, the water tolerance is in a range of between about 300% and about 500%, or between about 200% and about 400%. In a particular embodiment, the water tolerance upon termination of the reaction mixture is about 390%. Termination of the reaction is achieved by adjusting the temperature of the reaction mixture to have a temperature equal to or less than about 50° C., preferably equal to or less than about 40° C. In a preferred embodiment, the temperature of the reaction mixture is in a range of between about 85° C. and about 95° C., more preferably between about 90° C. and about 95° C., and, upon the targeted water tolerance has been reached thereafter, the reaction mixture is cooled to about 40° C. or below. The reduction of the reaction temperature can be done in any suitable method known in the art. In one embodiment, the temperature is reduced by subjecting to the reaction vessel to chilled liquid, such as water, by applying vacuum (e.g., 200-700 mm Hg), and/or by using an evaporation technique. Preferably, the reaction is terminated by subjecting to the reaction vessel to chilled liquid, such as chilled water, and/or by the use of reduced pressure (i.e., by applying vacuum). Preferably, agitation of the reaction mixture continues during cooling. Preferably the rate of cooling is in a range of between about 5° C./min. and about 1° C./min, and most preferably is about 2° C./min.

After cooling the reaction mixture to thereby form an intermediate composition, a suitable amount of resorcinol is added to the intermediate composition to form a resorcinol-modified phenolic resin. Preferably, the water content of the intermediate composition is at least about 50 wt % of the total weight of the intermediate composition. More preferably, the water content of the intermediate composition is in a range between about 50 wt % and about 60 wt % of the total weight of the intermediate composition. Even more preferably, the water content of the intermediate composition is in a range between about 50 wt % and about 55 wt % of the total weight of the intermediate composition. The resorcinol can be mixed with the intermediate composition in any form. In one embodiment, the resorcinol is added to the intermediate composition in the form of an aqueous solution. Preferably, the aqueous solution includes resorcinol in an amount of between about 50 wt. % and about 99 wt. % of the total solution, the balance of the solution including water. Alternatively, essentially pure resorcinol can also be employed in the method of the invention.

In one embodiment, the reaction mixture, with the resorcinol, is then heated to a temperature in a range of between about 50° C. and about 70° C., preferably in a range of between about 55° C. and about 65° C., and more preferably about 60° C. to form a resorcinol-modified phenolic resin. In a preferred embodiment, the raised temperature is maintained for a reaction period to allow the resorcinol to react with the intermediate composition, for example, at least a portion of the formaldehyde present in the intermediate composition. An optimal value for any particular application of the reaction period can be varied depending upon the scale of the reaction, which one skilled in the art can find without undue experimentation. In a specific embodiment, the reaction period is in a range of between about 45 minutes and about 90 minutes, and more specifically between about 45 minutes and about 75 minutes. In a more specific embodiment, the reaction temperature is maintained at about 60° C. for a period of time of about 60 minutes.

The resorcinol-modified phenolic resin can optionally further be modified with an alkanolamine to form a resorcinol-alkanolamine-modified phenolic resin. In one embodiment, the resorcinol-alkanolamine-modified phenolic resin is formed by adding an alkanolamine into a composition including the resorcinol-modified phenolic resin. In one specific embodiment, the composition including the resorcinol-modified phenolic resin can be the composition resulted from the processes of formation of a resorcinol-modified phenolic resin as described above. The amount of the alkanolamine added is in an amount of between about 0.1 weight % and about 15 weight % (such as between about 0.1 weight % and about 10 wt %, or between about 0.1 weight % and about 5 wt %, between about 0.1 weight % and about 3 wt %, between about 1 weight % and about 10 wt %, between about 1 weight % and about 5 wt %, or between about 1 weight % and about 3 wt %) based on the weight of the benzene-ol combined to form the reaction mixture, whereby the alkanolamine undergoes chemical reaction with the composition including a resorcinol-modified phenolic resin to thereby form a resorcinol-alkanolamine-modified phenolic resin. As used herein, an "alkanolamine" means a compound represented by $NR'_{(3-x)}(R''OH)_x$, wherein x is 1, 2 or 3, particularly 1; R' is —H or a C1-C10 alkyl group, particularly —H; and R" is a C1-C10 alkylene group. Each of the alkyl group and alkylene group represented by R' and R", respectively, can independently be substituted with one or more substituents. Examples of suitable substituents include halogen (e.g., F, Cl, Br, I), C1-C6 alkyl, C1-C6 alkoxy, C1-C6 haloalkoxy, C1-C6 haloalkyl, phenyl and benzyl. In a specific embodiment, R' is —H or a C1-C6 alkyl group (e.g., —CH$_3$ or C$_2$H$_5$), particularly —H; and R" is a C1-C6 alkylelene group. In one more specific embodiment, x is 1; R' is —H or a C1-C6 alkyl group (e.g., —CH$_3$ or C$_2$H$_5$), particularly —H; and R" is a C1-C6 alkylelene group. In another specific embodiment, the alkanolamine is an ethanolamine represented by NR'$_{(3-x)}$(C$_2$H$_5$OH)$_x$, wherein x is 1, 2 or 3, particularly 1; and R' is —H or a C1-C10 alkyl group. In another specific embodiment, the ethanolamine is represented by NR'$_{(3-x)}$(C$_2$H$_5$OH)$_x$, wherein x is 1, 2 or 3, particularly 1; and R' is —H or a C1-C6 alkyl group, particularly —H. In yet another specific embodiment, the ethanolamine is represented by NH$_2$(C$_2$H$_5$OH) or NH(C$_2$H$_5$OH)$_2$.

In a preferred embodiment of the formation of a resorcinol-alkanolamine-modified phenolic resin, the reaction mixture including the alkanolamine and the resorcinol-modified phenolic resin is maintained at a temperature in a range of between about 50° C. and about 70° C., preferably in a range of between about 55° C. and about 65° C., and more preferably about 60° C. In a preferred embodiment, the temperature is maintained for a reaction period, for example, at least a portion of the formaldehyde present in the composition. An optimal value for any particular application of the reaction period can be varied depending upon the scale of the reaction, which one skilled in the art can find without undue experimentation. In a specific embodiment, the reaction period is in a range of between about 25 minutes and about 60 minutes, and more specifically between about 25 minutes and about 45 minutes. In a more specific embodiment, the reaction temperature is maintained at about 60° C. for a period of time of about 30 minutes.

In yet another specific embodiment, following the reaction of the resorcinol in the formation of a resorcinol-modified phenolic resin, or following the reaction of the alkanolamine in the formation of a resorcinol-alkanolamine-modified phenolic resin, at least a portion of the water present is removed by a suitable method. In one, more specific embodiment, between about 60 wt % and about 80 wt % of the water present is removed by a suitable method, such as by vacuum distillation. In one, even more specific embodiment, vacuum distillation is conducted at a temperature in a range of between about 55° C. and about 65° C. Preferably, vacuum distillation is conducted at a temperature of about 60° C.

In yet another specific embodiment, following the reaction of the resorcinol in the formation of a resorcinol-modified phenolic resin, or following the reaction of the alkanolamine in the formation of a resorcinol-alkanolamine-modified phenolic resin, at least a portion of the water present is removed by a suitable method. In one specific embodiment, between about 60 wt % and about 80 wt % of the water present is removed by a suitable method, such as by vacuum distillation. In one embodiment, vacuum distillation is conducted at a temperature in a range of between about 55° C. and about 65° C. Preferably, vacuum distillation is conducted at a temperature of about 60° C.

Preferably, the viscosity of the resorcinol-modified phenolic resin and the viscosity of the resorcinol-alkanolamine-modified phenolic resin, independently, are in a range of between 2,000 cps and about 20,000 cps at a temperature of about 25° C. Preferably, the viscosity of the resorcinol-modified phenolic resin and the viscosity of the resorcinol-alkanolamine-modified phenolic resin, independently, are in a range of between about 2,000 cps and about 10,000 cps, more preferably in a range of between about 2,000 cps and about 5,000 cps, such as about 3000 cps. The viscosity of the resorcinol-modified phenolic resin and the viscosity of the resorcinol-alkanolamine-modified phenolic resin, independently, are typically remains essentially constant for at least about 1 hour. As used herein, "essentially constant" viscosity means that change of viscosity over time is less than about 10% of the original viscosity. Preferably, the viscosity of the resorcinol-modified phenolic resin remains essentially constant for at least about 3 hours.

Preferably, the resorcinol-modified phenolic resin and the resorcinol-alkanolamine-modified phenolic resin, independently, have essentially constant water tolerance for at least about 1 hour. As used herein, "essentially constant" water tolerance means that change of water tolerance is less than about 10% of the original water tolerance. Preferably, the water tolerance of the resorcinol-modified phenolic resin and the water tolerance of the resorcinol-alkanolamine-modified phenolic resin, independently, are resin remains essentially constant for at least about 3 hours.

In one embodiment, free formaldehyde content of the resorcinol-modified resin and the resorcinol-alkanolamine-modified resin typically is each independently less than about 0.3 wt % of 100 g of the resin, such as in a range of between about 0.1 and about 0.295 wt % of 100 g of the resin, or between about 0.1 and about 0.2 wt % of 100 g of the resin. Free formaldehyde content of the resulting resin can be reduced to less than about 0.05 wt % of 100 g of the resin by optimizing resorcinol loading and water tolerance during formation of the resin. In another embodiment, the modified phenolic resin compositions of the invention that include the resorcinol-modified resin or the resorcinol-alkanolamine-modified resin, each independently, have free formaldehyde content less than about 0.3 wt % of 100 g of the resin, such as in a range of between about 0.1 and about 0.295 wt % of 100 g of the resin, or between about 0.1 and about 0.2 wt % of 100 g of the resin. The content of formaldehyde can be measured by any suitable method known in the art. For example, it can be measured by titration of free formaldehyde (HCHO) with hydroxylamine (NH$_2$HOH), such as hydroxylamine hydrochloride (NH$_2$HOH.HCl), as shown in the following reaction:

$$HCHO + NH_2HOH.HCl \rightarrow H_2O + CH_2NOH + HCl \qquad (2)$$

The hydrochloric acid formed in reaction (2) is potentiometrically determined with a reagent grade NaOH solution.

The term "alkyl" used alone or as part of a larger moiety, such as "alkoxy", "haloalkyl", and the like, includes as used herein means saturated straight-chain, cyclic or branched aliphatic group. Typically, an alkyl group includes 1-10 carbon atoms. In some embodiments, an alkyl group includes 1-6 carbon atoms, specifically, 1-5 carbon atoms. Alternatively, an alkyl group includes 1-4 carbon atoms.

The term "alkoxy" means —O-alkyl.

The terms "haloalkyl" and "haloalkoxy" means alkyl or alkoxy, as the case may be, substituted with one or more halogen atoms. The term "halogen" means F, Cl, Br or I. Preferably the halogen in a haloalkyl or haloalkoxy is F or Cl.

An "alkylene group" is represented by —[CH$_2$]$_z$—, wherein z is a positive integer, such as from one to ten, from one to six, or from one to four.

A curable resin composition of the invention includes a resorcinol-modified phenolic resin composition or a resorcinol-alkanolamine-modified phenolic resin composition, prepared by a method described above. As used herein, an uncured or uncrosslinked "resin" is a composition for curing or crosslinking, comprising one or more components selected from monomers, oligomers, and polymers, and may optionally contain other additives such as colorants, stabilizers, plasticizers, fillers, solvents, antiloading agents, or the like. Generally, a resin includes a mixture of partially polymerized components that harden upon curing, which is typically the result of a crosslinking reaction. The uncured or uncrosslinked resin can be cured by initiation with light, electron beam radiation, acid, base, heat and combinations thereof.

The curable resin composition of the invention, including a resorcinol-modified phenolic resin composition, or a resorcinol-alkanolamine-modified phenolic resin composition, prepared by a method described above, can be employed as a resin binder in abrasive products, such as bonded abrasive products (e.g., abrasive wheels, disks and horns) and coated abrasive products (e.g., abrasive films and papers). In one embodiment, the abrasive product of the invention includes a plurality of abrasive particles and a resin binder cured from the resin composition. The resin composition can be blended with a plurality of abrasive particles or, in the alternative, applied over abrasive particles and then cured to form a make coat or a size coat over a base layer and the plurality of abrasive particles of an abrasive product. After application of the resin composition, either as a bond, a make coat or a size coat, the resin composition is cured under suitable conditions, such as one known in the art.

In one embodiment, the abrasive product of the invention is a coated abrasive product that includes a base layer, a plurality of abrasive particles, and a resin coat attaching the plurality of abrasive particles to the base layer. The resin coat is cured from a curable resin composition of the invention described above. In another embodiment, the abrasive product of the invention is a bonded abrasive product that includes a plurality of abrasive powders and a resin binder cured from a curable resin composition as described above. In the bonded abrasive product, the abrasive powders are typically bonded together with the use of the resin binder, and form a three-dimensional shape, such as a wheel.

Figure 2:
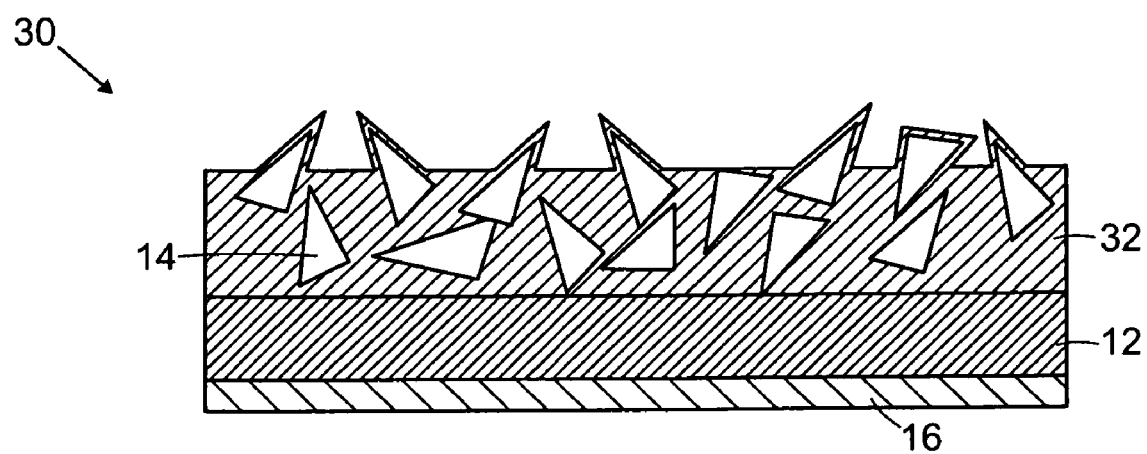
FIG. 2 is a schematic representation of a cross-sectional view of another embodiment of a coated abrasive product of the invention.

The coated abrasive product of the invention generally includes a substrate (i.e., base layer), abrasive particles and at least one binder to hold the abrasive particles to the substrate. As used herein, the term "coated abrasive product" encompasses a nonwoven abrasive product. FIGS. 1 and 2 show coated abrasive products 10 and 30 of the invention. Referring to FIG. 1, in coated abrasive product 10, substrate 12 is treated with optional backsize coat 16 and optional presize coat 18. Overlaying the optional presize coat 18 is make coat 20 to which abrasive material 14, such as abrasive grains or particles, are applied. Size coat 22 is optionally applied over make coat 20 and abrasive particles 14. Overlaying size coat 22 is optional supersize coat 24. Depending upon their specific applications, coated abrasive product 10 may or may not include backsize coat 16 and/or presize coat 18. Also, depending upon their specific applications, coated abrasive product 10 may or may not include size coat 22 and/or supersize coat 24. Shown in FIG. 2 is coated abrasive product 30 that includes a single layer of abrasive particles 14 and adhesive(s) (binder-abrasive layer 32) and optionally backsize coat 16. Optionally, presize coat 18, size coat 22 and supersize coat 24, as shown in FIG. 1, can be included in coated abrasive product 30.

In some embodiments, a curable resin composition of the invention is used in forming at least one layer selected from the group consisting of binder-abrasive layer 32, backsize coat 16, presize coat 18, make coat 20, size coat 22 and supersize coat 24. In a specific embodiment, a curable resin composition of the invention is used in forming at least one adhesive layer selected from the group consisting of presize coat 18, make coat 20 and size coat 22. In a preferred embodiment, a curable resin composition of the invention is used to form a binder for affixing abrasive particles 14 to substrate 12, for example, for forming binder-abrasive layer 32 or at least one coat of coats 20 (make coat) and 22 (size coat). In a specifically preferred embodiment, a curable resin composition of the invention is used to form a binder for binder-abrasive layer 32. In these embodiments, abrasive particles 14 can be applied separately by gravity, electrostatic deposition or in air stream, or as slurry together with the curable resin composition.

Substrate 12 may be impregnated either with a resin-abrasive slurry or a resin binder without abrasive grains, depending upon the required aggressiveness of the finished coated abrasive tools, as described above. Substrate 12 useful in the invention can be rigid, but generally is flexible. Substrate 12 can be paper, cloth, film, fiber, polymeric materials, nonwoven materials, vulcanized rubber or fiber, etc., or a combination of one or more of these materials, or treated versions thereof. The choice of the substrate material generally depends on the intended application of the coated abrasive tool to be formed. In a preferred embodiment, substrate 12 is a nonwoven material. As used herein, "nonwoven" means a web of random or directional fibers held together mechanically, chemically, or physically, or any combination of these. Examples of nonwoven materials include fibers formed into a nonwoven web that provides as a three-dimensional integrated network structure. Any fibers known to be useful in nonwoven abrasive tools can be employed in the invention. Such fibers are generally formed from various polymers, including polyamides, polyesters, polypropylene, polyethylene and various copolymers thereof. Cotton, wool, blast fibers and various animal hairs can also be used for forming nonwoven fibers. In some applications, the nonwoven substrate can include a collection of loose fibers, to which abrasive particles 14 are added to provide an abrasive web having abrasive particles 14 throughout.

Depending upon which adhesive layer(s) the curable resin composition of the invention is utilized for, abrasive particles 14 are applied over a substrate prior to, after and/or simultaneously with the application of the curable resin composition to the substrate. Abrasive particles 14 can be applied over substrate 12 by spraying (via gravity, electrostatic deposition or air stream) or by coating. In a specific embodiment, abrasive particles 14 are applied over substrate 12 simultaneously with the curable resin composition. In one example of this embodiment, as shown in FIG. 2, the curable resin composition and abrasive particles are mixed together to form a binder-abrasive composition slurry, and the slurry is applied over substrate 12 to form single binder-abrasive composition layer 32. In another specific embodiment, abrasive particles 14 are applied over a coating of the curable resin composition. In one example of this embodiment, the curable resin composition is used for forming at least one of the backsize, presize and make coats. In yet another embodiment, abrasive particles 14 are applied prior to the application of the curable resin composition to substrate 12. In one example of this embodiment, the curable resin composition is used for forming at least one of the size and supersize coats.

A suitable material for abrasive particles 14 useful in the invention can be of any conventional abrasive particle material utilized in the formation of coated abrasive tools. Examples of suitable abrasive particle materials for use in the invention include diamond, corundum, emery, garnet, chert, quartz, sandstone, chalcedony, flint, quartzite, silica, feldspar, pumice and talc, boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride. The abrasive materials can be oriented or can be applied to the substrate without orientation (i.e., randomly), depending upon the particular desired properties of the coated abrasive tools. In choosing an appropriate abrasive material, characteristics, such as size, hardness, compatibility with workpieces and heat conductivity, are generally considered. Abrasive particle materials useful in the invention typically have a particle size ranging from about 0.1 micrometer and about 1,500 micrometers, such as from about 10 micrometers to about 1000 micrometers.

The adhesive layer(s) of coated abrasive products 10 and 30 can be made by any suitable method, such as one generally known in the art. In one embodiment, optional backsize coat 16 and optional presize coat 18, not containing abrasive particles 14, are coated on substrate 12 and cured by exposure to heat in order to impart sufficient strength to substrate 12 for further processing. Then, make coat 20 is applied to substrate 12 to secure abrasive particles 14 throughout substrate 12, and while the coat is still tacky, abrasive particles 14 are applied over make coat 20. The make coat is subsequently cured so as to hold abrasive particles 14 in place. Thereafter, size coat 22 is applied over substrate 12, and then cured. The primary function of size coat 22 generally is to anchor abrasive particles 14 in place and allow them to abrade a workpiece without being pulled from the coated abrasive structure before their grinding capability has been exhausted. In another embodiment, a slurry of abrasive particles 14 and a resin binder composition described above, is applied over substrate 12, optionally on presize coat 18 over substrate 12, and then cured.

In some cases, supersize coat 24 is deposited over size coat 22. Supersize coat 24 can be deposited with or without a binder, as described above. Generally, the function of supersize coat 24 is to place on a surface of coated abrasive materials 14 an additive that provides special characteristics, such as enhanced grinding capability, surface lubrication, anti-static properties or anti-loading properties. Examples of suitable grinding aids include $KBF_4$ and calcium carbonate. Examples of suitable lubricants for supersize coat 24 include lithium stearate. Examples of suitable anti-static agent include alkali metal sulfonates, tertiary amines and the like. Examples of suitable anti-loading agents include metal salts of fatty acids, for example, zinc stearate, calcium stearate, lithium stearate, sodium laurel sulfate and the like. Anionic organic surfactants can also be used effective anti-loading agents. A variety of examples of such anionic surfactants and antiloading compositions including such an anionic surfactant are described in U.S. Patent Application Publication No. 2005/0085167 A1, the entire teachings of which are incorporated herein by reference. Other examples of suitable anti-loading agents include inorganic anti-loading agents, such as metal silicates, silicas, metal carbonates and metal sulfates. Examples of such inorganic anti-loading agents can be found in WO 02/062531, the entire teachings of which are incorporated herein by reference.

In some specific embodiments, the coated abrasive product of the invention includes a nonwoven substrate, such as a nonwoven substrate made from an air-laid process which is well known in the art. The nonwoven substrate is impregnated with a coating composition described above, and an abrasive material, such as fine abrasive particles. The uncured, impregnated nonwoven substrate is wound spirally to form a log. Alternatively, the uncured impregnated nonwoven substrate is cut into sheets and the sheets are stacked between two metal plates to form a slab. The log or slab is then heated to form the nonwoven abrasive tool. Optionally, the cured log or slab is converted into a final shape normally used for polishing, deburring, or finishing applications in the metal or wood industries.

The curable resin composition of the invention can optionally further include one or more additives, such as fillers, coupling agents, fibers, lubricants, surfactants, pigments, dyes, wetting agents, grinding aids, anti-loading agents, anti-static agents and suspending agents. Specific additive(s) that is included in the resin composition can be chosen depending upon for which adhesive layer(s) (e.g., coats 16, 18, 20, 22, 24 and 32 of FIGS. 1 and 2) the resin composition is employed. For example, as discussed above, supersize coat 24 can include one or more anti-loading agents. One or more grinding aids can be included in size coat 22 and/or make coat 20. The amounts of these materials are selected, depending upon desired properties to achieve.

The abrasive product of the invention can generally take the form of sheets, discs, belts, bands, and the like, which can be further adapted to be mounted on pulleys, wheels, or drums. The coated abrasive product of the invention can be used for sanding, grinding or polishing various surfaces of, for example, steel and other metals, wood, wood-like laminates, plastics, fiberglass, leather or ceramics. In one embodiment, the abrasive product of the invention is used for abrading a work surface by applying the abrasive product in an abrading motion to remove a portion of the work surface.

The following examples are representative of the invention, and not intended to be limiting in any way.

EXEMPLIFICATION

Example 1

Synthesis of Modified PF Resins of the Invention

A. Specifications of the Raw Materials
Phenol:
Phenol taken=500 gm
Generally technical grade of Phenol with defined purity 94% minimum
Freezing point=40.9 deg C.
Boiling point is 181.1 deg C.
Specific gravity=1.0563
Formaldehyde Solution
Formaldehyde was used as an aqueous solution, which was 38.3% in concentration. Methanol up to about 5 wt % was added to formaldehyde to stabilize the formaldehyde and avoid the formation of para-formaldehyde.

$$\text{Formaldehyde taken} = (500*0.94*1.73*30*100)/(94*38.3)$$

$$= 677.546 \, g$$

Para Formaldehyde

Para formaldehyde was used as Solid powder having a purity of 96%

Para formaldehyde taken =

$$(500*0.94*1.73*30*100)/(94*96) = 270.316 \, g$$

NaOH Catalyst

2% based on the phenol weight taken for the example:

NaOH taken = 0.94*500*0.02 = 9.4 gm, which is dissolved in 9.4 gm water

Resorcinol 5 wt % of resorcinol, based on the weight of the phenol taken from the example, was used in the example. Resorcinol was added as an aqueous solution to reduce free formaldehyde present in phenol formaldehyde resin after obtaining particular water tolerance to the phenol formaldehyde resin.

Resorcinol taken = 0.94*500*0.05

= 23.5 gm, dissolved in 23.5 gm water

Mono Ethanol Amine (Mea)
Purity=98% min
Sulphated ash: 0.1% max
Freezing point=9-10. 5° C.

Mono ethanol amine = 0.94*500*0.004

= 1.88 g.

B. Synthesis of Phenolic Resins

B1. Resorcinol Modified Phenolic Resin

The resorcinol-modified resole resin was prepared as follows:

About 500 gm of phenol, formalin (38.3%) 677.546 g and basic catalyst 2% parts based on phenol weight were charged in a reaction kettle equipped with an agitator and a condenser. The alkaline catalyst was added and the pH of the batch was checked. The temperature of the reaction was controlled within about 1° C. by externally heating the mixture in a water bath and indirectly controlling the water bath temperature.

The water bath set temperature was varied from 50° C. to about 90° C. in steps by watching the temperature in the kettle. There was sufficient exothermic reaction so that heating of reaction kettle stopped when the reaction temperature was reaches 60-70° C. The reaction was stopped at a desired water tolerance. The water tolerance indicated the approximately molecular weight of the resole. In this example, the reaction was stopped at a water tolerance of about 390%. The water tolerance was measured as described in the specification above.

The reaction mixture was then cooled to 40° C. A freshly prepared resorcinol solution (23.5 g in 23.5 g water) was added to the mixture. Then the reaction mixture was allowed to react for about 1 hour at 60° C. A portion of the water present in the reaction mixture was then distilled under vacuum distillation at 60° C. to obtain the desired viscosity. One way to determine the suitable viscosity was by determining the refractive index which was generally in proportion to the viscosity. In this example, about 324 ml of water was distilled from the resin. After the distillation, the viscosity of the resin at 25° C. was 3000 cps. Gel time, free formaldehyde content and water tolerance of the resin were also measured.

B1. Resorcinol-Alkanolamine-Modified Phenolic Resin

The resorcinol-alkanolamine-modified phenolic resin was prepared as follows:

About 500 gm of phenol, paraformaldehyde (96%) 270.316 g were charged into reactor equipped with an agitator and a condenser, and the reaction mixture was maintained at 45° C. The basic catalyst (NaOH catalyst), divided into four equal parts, was added to reaction mixture at an interval of half an hour. The reaction temperature was controlled not exceed 50° C. The temperature of the reaction was controlled within about 1° C. by externally heating the mixture in a water bath and indirectly controlling the water bath temperature.

After completion of catalyst loading, the reaction mixture was further kept at 50° C. for 2½ hour to ensure all exothermic reaction diminished. Then reaction temperature was then increased from 50° C. to about 90° C. stepwise. The reaction was stopped at a water tolerance of about 390%. The water tolerance was measured as described in the specification above.

The reaction mixture was then cooled to 40° C. A freshly prepared resorcinol solution (23.5 g in 23.5 g water) was added to the mixture. Then the reaction mixture was allowed to react for about 1 hour at 60° C. And then, 1.88 g of MEA was added, and the reaction mixture was kept at 60° C. for half an hour. After the reaction, the viscosity of the resin at 25° C. was 2400 cps. Gel time, free formaldehyde content and water tolerance of the resin were also measured.

C1. Free Formaldehyde Contents

The contents of free formaldehyde in a conventional PF resole, and resorcinol-modified and resorcinol-alkanolamine-modified resins were determined based on the reaction of Hydroxylamine hydrochloride with formaldehyde, as shown in reaction (2):

$$CH_2O+NH_2HOH.HCl \rightarrow H_2O+CH_2NOH+HCl \qquad (2).$$

The hydrochloric acid formed in the reaction was potentiometrically determined with reagent grade NaOH solution. In one example, about 3 g of the resin was weighed in glass beaker, and 50 ml of methanol was gradually added into the beaker with continuous stirring. The electrodes of the measuring equipment were cleaned several times with distilled water and acetone and immediately pH electrodes were placed in solution. Then solution was neutralized by using 1N Hydrochloric acid till milli-volt reading approaches to standard value 123, (the standard value 123 was equivalent to a pH of 4). Then, 25 ml Hydroxylammonium chloride was added into the solution. After about 5 minutes, the solution was titrated using 0.5N NaOH until the pH of the solution reached the standard value (pH 4). A blank test was ran using the same reagent and conditions but omitting sample, and used as a reference value (blank value). Under the normal condition, the blank titer was typically less tan 0.1 ml and it was considered to be Zero. The content of free formaldehyde (FFC) was calculated base upon the titration results, as shown below:

F.F.C=((Titrated value-Blank value)*3.003*Normality of NaOH)/Weight of resin   (3)

The control conventional phenolic resin was made by a batch process in a four necked round bottom flask (reaction kettle) equipped with an agitator and a condenser, as described above, except the resorcinol-modification steps.

Table 1 shows certain properties of the resorcinol-modified phenolic resin, the resorcinol-MEA-modified phenolic resin and the conventional phenolic resin. As shown in Table 1, the free formaldehyde contents of the resorcinol-modified phenolic resin and the resorcinol-MEA-modified phenolic resin were substantially lower than that of the control conventional phenolic resin.

TABLE 1

Properties of Conventional and Resorcinol-Modified Phenolic Resins

| PROPERTIES | CONTROL RESIN | RESORCINOL MODIFIED RESIN | RESORCINOL-MEA-MODIFIED RESIN |
|---|---|---|---|
| VISCOSITY (cps) | 2500-4500 | 3000 | 2400 |
| Free Formaldehyde | 1.2% | 0.1-0.295% | 0.08-0.15 |
| GEL TIMES@1210° C. | 10.30-11.0 | 11.45 | 10.23 |
| WATER TOLERANCE (%) | 200-300 | 573.6 | 304.09 |

Example 2

Formaldehyde Reduction Versus the Amount of Resorcinol Loading

Resorcinol-modified phenolic resins ("LTR"), having 2.5 wt % resorcinol, 5 wt % resorcinol, 7.5 wt % resorcinol and 10 wt % resorcinol, based on the weight of the phenol used for the preparation of the resorcinol-modified phenolic resins, were prepared as described in Example 1.

Figure 3:
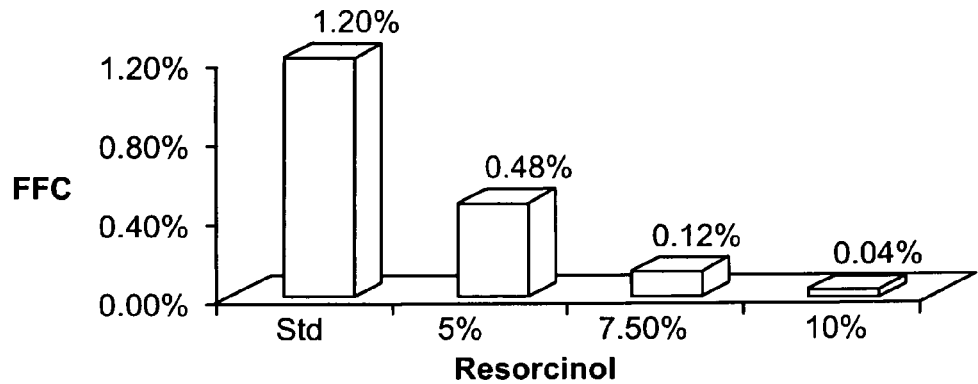
FIG. 3 is a graph showing formaldehyde reduction effect in resorcinol-modified phenolic resins made by one embodiment of a method of the invention.

FIG. 3 shows the effect of resorcinol loading amount for reduction of free formaldehyde in the resorcinol-modified phenolic resins. As shown in FIG. 3, as the loaded amount of resorcinol increased, the amount of free formaldehyde (FFC) decreased. In FIG. 3, the conventional control sample is indicated with characters "std."

Figure 4:
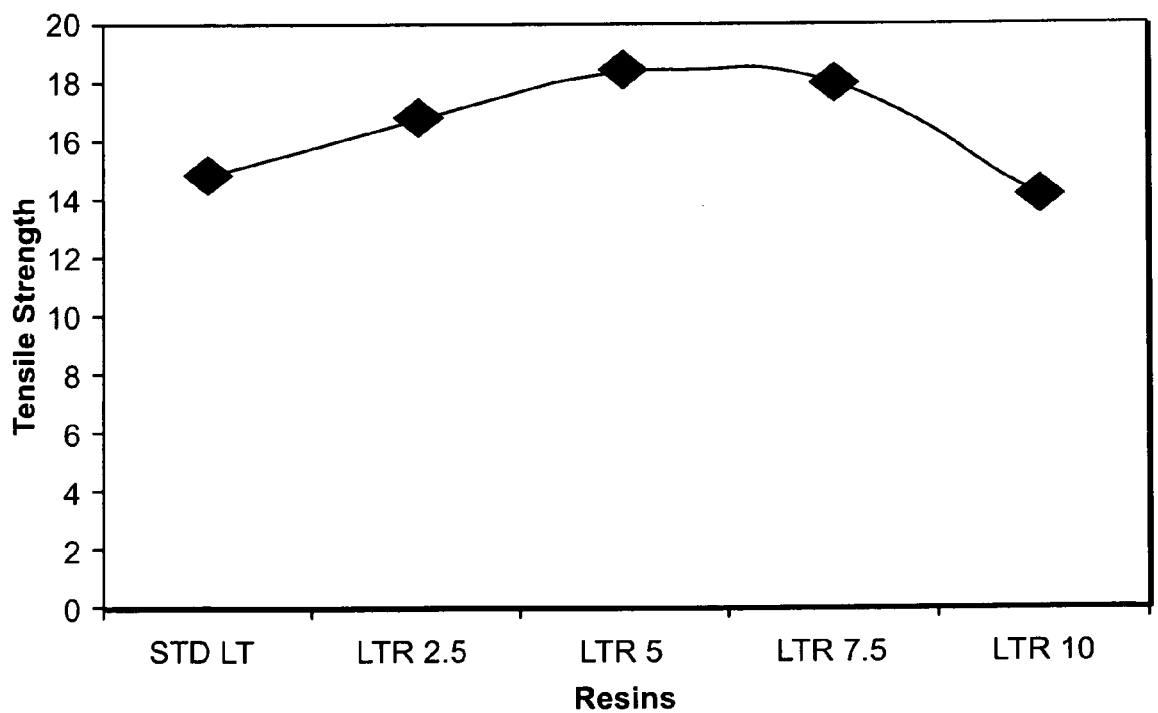
FIG. 4 is a graph showing tensile strength of resorcinol-modified phenolic resins made by one embodiment of a method of the invention.

Tensile strength of the resorcinol-modified phenolic resins and the control resin is shown in FIG. 4 (std: conventional resin; LTR 2.5:2.5 wt % resorcinol-modified resin; LTR 5:5 wt % resorcinol-modified resin; LTR 7.5:7.5 wt % resorcinol-modified resin; LTR 10:10 wt % resorcinol-modified resin). As shown in FIG. 4, the tensile strength of the resorcinol-modified phenolic resins was comparable to, or even greater than (in the 2.5 wt % resorcinol-, 5 wt % resorcinol- and 7.5 wt % resorcinol-modified resins) that of the control resin.

Various mechanical properties of the conventional phenolic resin and of the 5 wt % resorcinol-modified phenolic resin are summarized in Table 2 below. As shown in the table, the mechanical strength of the 5 wt % resorcinol-modified phenolic resin was greater than that of the conventional phenolic resin.

TABLE 2

Mechanical Properties of Resorcinol-Modified Phenolic Resin and Control Conventional Phenolic Resin

| Type of Resin | Impact Properties (J/m) | Flexural strength (N/mm$^2$) | Flexural modulus (N/mm$^2$) | HDT* (° C.) |
|---|---|---|---|---|
| Std LT | 132.63 | 49.723 | 2976.92 | 181.2 |
| LTR 5 | 154.94 | 61.94 | 3483.78 | 185.1 |

*Heat deflection temperature.

Example 3

Performance of Coated Abrasive Products Employing Resorcinol-Modified Phenolic Resin Bond A coated abrasive product of the invention employing a 5 wt % resorcinol-modified phenolic resin ("LTR resin 2"), as prepared as described in Example 1, for its presize, make and size coats was prepared. A control coated abrasive product employing conventional phenolic resins CGF-1 ("standard resin 1") and CGF-2 ("standard resin 2") which was commercially available from West Coast Polymers, Ltd, for its pre-size, make and size coats also was prepared. Specification of the presize, make and size coats for the abrasive product of the invention ("resorcinol-modified prodcut") and the control abrasive product ("standard abrasive product") are summarized in Table 3 below.

| FORMULATIONS | STANDARD PRODUCT | RESORCINOL-MODIFIED ABRASIVE PRODUCT |
|---|---|---|
| Front fill (Presize Coat) | Standard resin 1 = 630 gm<br>Standard resin 2 = 1.46 kg<br>Filler = 1.0 kg<br>Water = 250 gm<br>Viscosity - 2000 cps @ 28 C.<br>Wet add-on coating - 90 gsm | Standard resin 1 = 630 gm<br>LTR resin 2 = 1.46 kg<br>Filler = 1.0 kg<br>Water = 50 gm<br>Viscosity - 2000 cps @ 28 C.<br>Wet add-on coating - 90 gsm |
| Make Coat | Standard resin 1 = 1.5 kg<br>Standard resin 2 = 3.5 kg<br>Amino Silane = 22 gms<br>Filler = 3.75 kg<br>Water = 500 gm<br>Viscosity - 6000 cps @ 28 C.<br>Wet add-on coating - 154 gsm | Standard resin 1 = 1.5 kg<br>LTR resin 2 = 3.5 kg<br>Amino Silane = 22 gms<br>Filler = 3.75 kg<br>Water = 400 gm<br>Viscosity - 6100 cps @ 28 C.<br>Wet add-on coating - 150 gsm |
| Size coat | Standard resin 1 = 1.5 kg<br>Standard resin 2 = 3.5 kg<br>Amino Silane = 22 gm<br>Filler = 2.4 kg<br>Water = 800 gm<br>Viscosity - 1000 cps @ 30 C. | Standard resin 1 = 1.5 gms<br>LTR resin 2 = 3.5 kg<br>Amino Silane- = 22 gms<br>Filler = 2.4 kg<br>Water = 600 gm<br>Viscosity - 980 cps @ 30 C. |

In this example, a semi finished (saturated and backfill cloth) poly-cotton cloth was used as a substrate. For both the resorcinol-modified and the standard abrasive products, the presize coat was initially cured to 30% level, and then the make coat was applied onto it. The make coat was then initially cured to the extent of about 70%. While the make coat was still tacky, abrasive powders (aluminum oxide, ALO 50#) were applied. Over the abrasive powders, the size coat was applied and then cured. After both the resorcinol-modified and the standard abrasive products were fully cured (e.g., at 115° C. for 8 hours), the products were dwelled for one day and flexed by 38 mm steel rod at 50 psi. These products were then tested for the following properties:
1. Base adhesion at room temperate (cold base adhesion) and hot base adhesion at 110° C. for 2 hrs
2. 50×200 belt testing using aluminium of 6 mm thickness
3. 50×2000 belt testing using EN-8 of 12 mm thickness.

The results of the tests are summarized in Table 4 below. As shown in Table 4, the resorcinol-modified abrasive product showed comparable cold base adhesion to that of the standard abrasive product. Also, the resorcinol-modified abrasive product showed improved hot base adhesion compared to that of the standard abrasive product. In the grinding performance on aluminum and mild steel, the resorcinol-modified abrasive product showed improved performance compared to that of the standard abrasive product. These results indicated that the resorcinol modified PF resin of the invention performed equal or better than the standard PF resin.

TABLE 4

Adhesion and Material Removal Properties

|  | Standard Product | Resorcinol-Modified Product |
| --- | --- | --- |
| Cold Base Adhesion | 18.36 | 18.3 |
| Hot Base Adhesion | 11.58 | 14.56 |
| Aluminum Shed Test |  |  |
| Grinding Time | 3'.00" | 3'.00" |
| Material Removal (gm) | 13.3 | 18.1 |
| Grain Shedding (gm) | 7.8 | 7.9 |
| EN8 test |  |  |
| Material Removal (gm) | 812.5 | 833 |

Example 4

Performance of Coated Discs Employing Resorcinol-Modified Phenolic Resin Bond

In this example, ZC 5 (Zircon disc 36) products, employing aluminum oxides as abrasive grains, were prepared with the following formulations. A resorcinol-modified abrasive disc employed a blend of a 5 wt % resorcinol-modified PF resin ("LTR"), as prepared in Example 1, and conventional HT PF resin available from West Coast Polymers, Ltd. for its make and size coats. A control standard abrasive disc employed a blend of conventional LT and HT PF resins available from West Coast Polymers, Ltd. for its make and size coats.

TABLE 5

Specification of Make and Size Coats for Abrasive Disc of the Invention and Control Disc

| FORMULATION CODE | MAKE CAOT | SIZE COAT |
| --- | --- | --- |
| Standard Abrasive Disc | LT - 2 PART<br>HT - 1 PART<br>Filler - 1.5 PART | LT - 2 PART<br>HT - 1 PART<br>Filler - 1.5 PART<br>Blue Pigment |
| Resorcinol-Modified Abrasive Disc | LTR - 2 PART<br>HT - 1 PART<br>Filler - 1.5 PART | LTR - 2 PART<br>HT - 1 PART<br>DURA (calcium carbonate) - 1.5 PART<br>Blue Pigment |

The formulations were coated manually on a fiber and then spinning was done to get the standard make add-on. The gravity and UP coat was done as per the standard specifications. The discs were dried through OLC (standard retention time). The discs were then cooled before sizing. The size formulations were coated manually on the make dried product. The discs were spinned to get the required add-on.

Grinding performance of the standard abrasive product and the resorcinol modified abrasive disc was tested on aluminum and mild steel ("MS"). The results are summarized in Table 6 below.

TABLE 6

Performance of Abrasive Discs of the Invention and Control Discs

| Abrasive Products | Disc weight | JOB | Material Removal (gm) | Grain shedding in gms |
| --- | --- | --- | --- | --- |
| Standard Abrasive Disc | 59.2 | MS | 332 | 2.8 |
| Resorcinol-Modified Abrasive Disc | 59.3 | MS | 368 | 2.5 |
| Standard Abrasive Disc | 58.7 | Aluminum | 19.4 | 3.7 |
| Resorcinol-Modified Abrasive Disc | 61.3 | Aluminum | 19.2 | 1.6 |

As shown in Table 6, the resorcinol-modified abrasive disc, employing the resorcinol-modified PF resin of the invention, showed comparable and even superior material removal performance to that of the standard control abrasive disc. In particular, the shed values (bond degradation) of the resorcinol-modified product in both mild steel and aluminum tests were smaller than those of the standard product. These results indicated that the resorcinol modified PF resin bond provided comparable or improved performance over the standard PF resin bond.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:
1. A modified phenolic resin composition formed by a method comprising the steps of:
   a) combining a basic catalyst, formaldehyde, water and a benzene-ol to form a basic reaction mixture undergoing chemical reaction;
   b) terminating the chemical reaction of the reaction mixture when water tolerance of the reaction mixture is in a range of between about 300% and about 500% to thereby form an intermediate composition; and
   c) adding resorcinol to the intermediate composition in an amount of between 2.5% and 7.5% based on the weight of the benzene-ol combined to form the reaction mixture, whereby the resorcinol undergoes chemical reaction with the intermediate composition to form a composition that includes a resorcinol-modified phenolic resin, wherein the resorcinol-modified phenolic resin has a free formaldehyde content of between about 0.01 weight % and about 0.3 weight % of 100 g of the resin, and
wherein the tensile strength of the resin composition is at least 12% to 26% greater than the tensile strength of an equivalent resin composition where the only difference is that the equivalent resin composition has not been modified with any resorcinol.

2. The resin composition of claim 1, wherein the benzene-ol is phenol.

3. The resin composition of claim 2, wherein viscosity of the resorcinol-modified phenolic resin remains essentially constant for at least about 1 hour.

4. The resin composition of claim 2, wherein water tolerance of the resorcinol-modified-phenolic resin independently remains essentially constant for at least about 1 hour.

5. The resin composition of claim 2, wherein the resorcinol-modified phenolic resin has a free formaldehyde content of between about 0.05 weight % and about 0.2 weight % of 100 g of the resin.

6. The resin composition of claim 1, wherein the method further includes removing at least a portion of the water present in the resorcinol-modified phenolic resin composition.

7. The resin composition of claim 1, wherein the basic catalyst is selected from the group consisting of sodium hydroxide, lithium hydroxide, barium hydroxide and hydrates thereof, and a combination thereof.

8. The resin composition of claim 7, wherein the basic catalyst is sodium hydroxide.

9. The resin composition of claim 8, wherein the amount of the sodium hydroxide is between about 1 weight % and about 5 weight % of the amount of the benzene-ol combined to form the reaction mixture.

10. The resin composition of claim 9, wherein the amount of the sodium hydroxide is about 2 weight % of the amount of the benzene-ol combined to form the reaction mixture.

11. The resin composition of claim 1, wherein the resorcinol added to the intermediate composition is in an aqueous medium.

12. The resin composition of claim 11, wherein the amount of resorcinol added to the intermediate composition is in a range of between about 5 weight % and about 7.5 weight % of the amount of the benzene-ol combined to form the reaction mixture.

13. The resin composition of claim 12, wherein the amount of resorcinol added to the reaction mixture is about 5 weight % of the amount of the benzene-ol combined to form the reaction mixture.

14. The resin composition of claim 1, wherein the chemical reaction of the reaction mixture is terminated by adjusting the temperature of the reaction mixture to a temperature equal to or less than about 50° C.

15. The resin composition of claim 1, wherein the chemical reaction is terminated when the water tolerance of the reaction mixture is in a range of between 300% and about 500%.

16. The resin composition of claim 1, wherein reaction of the reaction mixture is initiated by exposing the reaction mixture to a temperature in a range of between about 50° C. and about 90° C.

17. The resin composition of claim 16, wherein the resorcinol is allowed to react with the intermediate composition at a temperature in a range of between about 50° C. and about 70° C.

18. The resin composition of claim 1, wherein the water content of the intermediate composition is at least about 50 wt % of the total weight of the intermediate composition.

19. The resin composition of claim 1, wherein the modified phenolic resin composition has a viscosity in a range of between about 2,000 cps and about 20,000 cps at about 25° C.

20. The resin composition of claim 1, wherein the method further includes adding an alkanolamine to the resorcinol-modified phenolic resin composition in an amount in a range of between about 0.1 weight % and about 15 weight % based on the weight of the benzene-ol combined to form the reaction mixture, whereby the alkanolamine undergoes chemical reaction with the resorcinol-modified phenolic resin composition to form a composition that includes a resorcinol-alkanolamine-modified phenolic resin.

21. The resin composition of claim 20, wherein the alkanolamine is NH2(C2H5OH) or NH(C2H5OH)2.

22. The resin composition of claim 20, wherein the amount of the alkanolamine is in a range of between about 0.1 weight % and about 5 weight % based on the weight of the benzene-ol combined to form the reaction mixture.

23. The resin composition of claim 20, wherein the temperature of the combined alkanolamine and the resorcinol-modified phenolic resin composition is adjusted to a temperature in a range of between about 50° C. and about 70° C.

24. The resin composition of claim 23, wherein the temperature of the combined alkanolamine and the resorcinol-modified phenolic resin composition is maintained for a reaction period in a range of between about 45 minutes and about 90 minutes.

25. The resin composition of claim 24, wherein the temperature of the combined alkanolamine and the resorcinol-modified phenolic resin composition is maintained at about 60° C. for a period of time of about 60 minutes.

26. The resin composition of claim 24, wherein the method further includes removing at least a portion of the water present in the resorcinol-alkanolamine-modified phenolic resin composition.

27. The resin composition of claim 20, wherein viscosity of the resorcinol-ethanol-amine-modified phenolic resin remains essentially constant for at least about 1 hour.

28. The resin composition of claim 20, wherein water tolerance of the resorcinol-ethanol-amine-modified phenolic resin independently remains essentially constant for at least about 1 hour.

29. The resin composition of claim 20, wherein the resorcinol-ethanol-amine-modified phenolic resin has a free formaldehyde content of between about 0.01 weight % and about 0.3 weight % of 100 g of the resin.

30. The resin composition of claim 29, wherein the resorcinol-ethanol-amine-modified phenolic resin has a free formaldehyde content of between about 0.05 weight % and about 0.2 weight % of 100 g of the resin.

31. The resin composition of claim 1, wherein the amount of resorcinol added to the reaction mixture is in a range of between about 2.5 weight % and about 5 weight % of the amount of benzene-ol combined to form the reaction mixture.

32. The resin composition of claim 1, wherein the chemical reaction is terminated when the water tolerance of the reaction mixture is 390%.

33. The resin composition of claim 1, wherein the resin composition is a component in a coated or bonded abrasive product as a cured resin.

34. The resin composition of claim 20, wherein the resin composition is a component in a coated or bonded abrasive product as a cured resin.

* * * * *